US012621067B2

(12) United States Patent
Wang et al.

(10) Patent No.: US 12,621,067 B2
(45) Date of Patent: May 5, 2026

(54) PREDICTIVE CHANNEL MODELING METHOD BASED ON GENERATIVE ADVERSARIAL NETWORK AND LONG SHORT-TERM MEMORY ARTIFICIAL NEURAL NETWORK

(71) Applicant: Southeast University, Jiangsu (CN)

(72) Inventors: Chengxiang Wang, Jiangsu (CN); Zheao Li, Jiangsu (CN); Jie Huang, Jiangsu (CN); Wenqi Zhou, Jiangsu (CN); Chen Huang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 323 days.

(21) Appl. No.: 18/564,273

(22) PCT Filed: Mar. 19, 2023

(86) PCT No.: PCT/CN2023/082379
§ 371 (c)(1),
(2) Date: Nov. 27, 2023

(87) PCT Pub. No.: WO2023/169589
PCT Pub. Date: Jul. 19, 2023

(65) Prior Publication Data
US 2024/0259121 A1      Aug. 1, 2024

(30) Foreign Application Priority Data

Mar. 7, 2022    (CN) .......................... 202210214717.0

(51) Int. Cl.
*H04B 17/391* (2015.01)
*H04W 24/06* (2009.01)

(52) U.S. Cl.
CPC ..... *H04B 17/3913* (2015.01); *H04B 17/3912* (2015.01); *H04W 24/06* (2013.01)

(58) Field of Classification Search
CPC ....................... H04B 17/3913; H04B 7/18513; H04B 11/00; H04B 17/26; H04B 7/18521;
(Continued)

(56) References Cited

U.S. PATENT DOCUMENTS

2018/0114096 A1* 4/2018 Sen ......................... G06N 3/084
2019/0274108 A1 9/2019 O'Shea et al.
(Continued)

FOREIGN PATENT DOCUMENTS

| CN | 112953862 A | 6/2021 |
|---|---|---|
| CN | 114584230 A | 6/2022 |
| WO | WO 2021082811 A1 | 5/2021 |

OTHER PUBLICATIONS

Kong. Dejiang et al."Prediction via Generative Adversarial Network with Spatial Temporal Embedding" (Pattern Recognition and Artificial Intelligence), Jan. 15, 2018 (Jan. 15, 2018); pp. 1-15.
(Continued)

*Primary Examiner* — Ajibola A Akinyemi
(74) *Attorney, Agent, or Firm* — MUNCY, GEISSLER, OLDS & LOWE, P.C.

(57) ABSTRACT

Disclosed in the present disclosure is a predictive channel modeling method based on a generative adversarial network and a long short-term memory artificial neural network, which method effectively achieves a channel prediction function in different frequency bands and scenarios, and generates a large number of channel data sets for simulation experiments. The method comprises: firstly, inputting channel measurement data for existing frequency bands and scenarios for training; then, learning true channel data using a long short-term memory artificial neural network, and acquiring a channel time sequence feature; by means of adversarial learning of a generative adversarial network, greatly eliminating redundant information of the channel data, and on the basis of the measurement data, generating (Continued)

accurate channel data, and acquiring massive channel information; and finally, achieving the balance between a generative model and a discriminative model during the continuous iteration of the generative adversarial network, and then outputting a trained predictive channel model. A statistical channel feature obtained by means of prediction by a model can clearly specify the predictive learning for a channel distribution feature in the present disclosure, and real-time and complex prediction problems in wireless communication can be solved.

5 Claims, 5 Drawing Sheets

(58) Field of Classification Search
CPC .......................... H04B 17/3912; H04B 17/101; H04B 17/102; H04B 17/104; H04B 7/0695; H04B 7/06958; H04B 7/0696

USPC ......................................................... 455/424
See application file for complete search history.

(56) References Cited

U.S. PATENT DOCUMENTS

| 2020/0073879 A1* | 3/2020 | Grabau ................. G06N 3/042 |
| 2021/0089903 A1 | 3/2021 | Murray |

OTHER PUBLICATIONS

Huang. Chen et al. "Artificial Intelligence Enabled Radio Propagation for Communications" Part II: Scenario Identification and Channel Modeling IEEE Transactions on Antennas and Propagation, Feb. 14, 2022 (Feb. 14, 2022); pp. 1-12.

* cited by examiner

PREDICTIVE CHANNEL MODELING METHOD BASED ON GENERATIVE ADVERSARIAL NETWORK AND LONG SHORT-TERM MEMORY ARTIFICIAL NEURAL NETWORK

TECHNICAL FIELD

The present disclosure belongs to the technical field of channel modeling, and specifically relates to a predictive channel modeling method based on a generative adversarial network (GAN) and a long short-term memory (LSTM) artificial neural network.

BACKGROUND

With the developments on new technologies and applications of the sixth generation wireless communication system (6G), the traditional passive channel characterizations bring some problems, such as the high channel measurement costs, the complex channel parameter estimations, and the lack of predictive capability to unknown information. The complex and various scenarios in the 6G standard require high-performance channel detectors for measurements, while the prices of these instruments are extremely high, and the channel measurements cannot exhaust all frequency bands and scenarios. In the case where the channel parameters are estimated, the channel data amount that needs to be processed is extremely large, and the algorithm complexity is high. Eventually, the traditional non-predictive channel models cannot predict future channel characteristics, as well as the unknown frequency bands or scenarios. In view of the above problems, a novel predictive channel modeling based on the 6G vision needs to be proposed, which actively identifies or controls the channels according to the physical environment.

Artificial intelligence (AI) technology rapidly develops and becomes a hot field thanks to its powerful ability in solving real-time prediction problems in the channel modeling. AI can not only learn and extract the potential characteristics that the traditional modeling methods cannot describe and collect from the real channel measurement data, but also can predict the channel distribution characteristics of the future time, the unknown frequency bands, and the unknown scenarios from the known information. The channel parameter estimation is an essential process for channel analysis and modeling. The channel characteristic prediction based on AI can greatly improve the accuracy and the efficiency in extracting parameters, and equipped with the ability of predicting channel characteristics from the specific environment to the general channel environment.

At present, the method for predicting and modeling the channel parameters based on AI generally relies on learning and training a plurality of independent channel characteristics in the data set, such as received power, delay spread (DS), and model angle information. The artificial intelligence algorithms used in these methods are generally the deep learning network algorithms such as feed-forward neural network (FNN), radial basis function neural network (RBF-NN), and convolutional neural network (CNN). However, these AI-based channel parameter prediction methods for the channel measurement data firstly increase the computational complexity of the channel modeling, and the independent channel parameter index values obtained after the prediction cannot effectively and directly reflect the continuous channel characteristics in the space-time domains.

Channel measurement is the core and the foundation of the traditional channel modeling research, while it is quite difficult to conduct the channel measurement and collect the data. On the one hand, the high-precision channel detection instruments are required, and on the other hand, a large number of manpower are required to conduct channel measurement campaigns in different communication scenarios. Due to the limitations in the manpower and the costs, the measurement scenarios are commonly quite limited, and the channel measurement for all of the frequency bands and the scenarios can not be exhausted. In addition, in order to achieve the balance between the universality and accuracy, the traditional channel models still have disadvantages in accuracy for certain specific communication scenarios. And in the modeling process, the parameter estimation has the disadvantages of requiring a large amount of data with high algorithm complexity. Moreover, due to the changes or the limitations on the environment, the measurement errors caused by human subjective judgments, and improper or faulty operations on the measurement instruments, a part of the channel measurement data are lost or affected by the errors, which leads to that the collected measurement data sets are insufficient and the data are inaccurate.

SUMMARY

The objectives of the present disclosure are to provide a predictive channel modeling method based on a GAN and a LSTM artificial neural network, to solve the technical problems of insufficient data set, low qualities and diversities in the required channel data, and low parameter generation efficiency in the channel modeling.

In order to solve the above-mentioned technical problems, the specific technical solutions of the present disclosure are as follows.

Provided is a predictive channel modeling method based on a GAN and a LSTM artificial neural network. And the method includes following steps.

In Step 1, environment where wireless channels are positioned and physical environment parameters for an antenna position are determined.

In Step 2, a frequency band, a line-of-sight (LOS) condition and a non-line-of-sight (NLOS) condition that are used for channel measurements in current environment are determined. A channel impulse response (CIR) to channel measurement data is collected by using the channel measurement instruments.

In Step 3, the collected channel measurement data are preprocessed, in the case where a neural network is used to train and learn channel data, an input CIR data set needs to be normalized.

In Step 4, a predictive channel model based on the GAN and the LSTM artificial neural network are constructed. Firstly, a part of a generative model for the GAN in the predictive channel model is constructed, and a function of the generative model is to generate the channel data with specific properties by utilizing noise vectors z.

In Step 5, a part of a discriminative model for the GAN of the predictive channel model is constructed.

In Step 6, after the predictive channel model based on the GAN and the LSTM artificial neural network is constructed, the predictive channel model is trained.

In Step 7, trained predictive channel model parameters are obtained and channel statistical characteristics are analyzed.

Further, Step 3 specifically includes the following steps.

In Step 3.1, a mean value u for channel measurement data examples and a standard deviation σ of the channel measurement data are calculated.

In Step 3.2, the CIR to the channel measurement data are normalized by using a z-score standardization means (z-score):

$$X = \frac{x - \mu}{\sigma},$$

where X is normalized data and x is original measurement data.

Further, Step 4 specifically includes the following steps.

In Step 4.1, three convolutional (Conv) layers are taken as the main structure of the generative model for the GAN.

In Step 4.2, a batch normalization (BN) layer is added after each of the Conv layers, and an output of each nodes in the neural network is normalized to enhance a generalization and a robustness of the generative model.

In Step 4.3, an activation function of a parametric rectified linear unit (PReLU) is used for reprocessing.

In Step 4.4, the LSTM artificial neural network is added into the constructed generative model for the GAN as an input port to construct a generative model framework for the GAN and the LSTM artificial neural network. A predictive issue of the LSTM artificial neural network is to predict a subsequent channel state by using states previous to j data in continuous channel data in in the space-time domain, and an output $h_t$ of the LSTM artificial neural network includes obtained time step update information from a space-time domain sequence:

$$h_t = f_{LSTM}(h(n - j + 1), h(n - j + 2), \dots , h(n)),$$

where $f_{LSTM}$ represents a functional of the LSTM artificial neural network for a sequence prediction on sequence data, h(n) is the CIR to the channel measurement data, and n is the nth sampling point in the continuous CIR sequence.

Further, Step 5 specifically includes the following steps.

In Step 5.1, four Conv layers are taken as the main structure of the discriminative model for the GAN, and the four Conv layers are used to extract multi-dimensional characteristics in the space-time domain, to facilitate identifying and correcting the generated channel data.

In Step 5.2, a BN layer is added after each of the Conv layers to enhance a generalization and a robustness of the model.

In Step 5.3, an activation function of a PReLU is used to improve an accuracy and an efficiency of a training.

In Step 5.4, a Dropout layer is added after the activation function of a PReLU to improve an anti over-fitting ability of the discriminative model.

In Step 5.5, an additional fully connected (FC) layer is added after a network structure of a last Conv layer, to act as a classifier in an entire CNN.

In Step 5.6, a Sigmoid growth curve activation function is added at an end of the discriminative model.

Further, Step 6 specifically includes the following steps.

In Step 6.1, the CIR obtained from measurements is input as a reference sample for an input of the model for training a predictive channel model.

In Step 6.2, during an iterative adversarial learning process of model training, a balance is achieved between an identification accuracy rate of the generative model for the predictive channel model and an identification accuracy rate of the discriminative model for the predictive channel model.

Further, Step 6.2 specifically includes following steps.

In Step 6.2.1, the generative model is set to process a random Gaussian noise vector z to obtain a generated data distribution $P_G$, and an actual data distribution is $P_{data}$.

In Step 6.2.2, in the case where the generated channel data are input into the discriminative model, these networks need to be repeatedly used in multiple training iterations, and a loss value for the discriminative model is minimized by dynamically adjusting a weight of this layer.

In Step 6.2.3, during a cyclic training process, an ability of the discriminative model tends towards a convergence value, thus obtaining an optimal value:

$$D_G^* = \frac{P_{data}}{P_G + P_{data}},$$

where $D_G^*$ is an optimal value of a discriminator.

The predictive channel modeling method based on the GAN and a LSTM artificial neural network of the present disclosure has the following advantages.

The present disclosure introduces an AI algorithm on the basis of the traditional wireless channel modeling, and provides a novel predictive channel modeling method based on the GAN-LSTM. Since the unique data adversarial generating ability of the present disclosure, the proposed disclosure excels in expanding and generating the channel measurement data sets, such that the difficult issue on obtaining the large data sets that occurs in the previous AI-based channel modeling can be effectively solved. Moreover, compared to all the other channel models based on AI, the present disclosure can generate more clearer and more real channel samples through the unsupervised learning based on a small number of the real channel parameters, and predict the channel distribution characteristics of the unknown frequency bands and the unknown scenarios through the long-term dependency learning between the sequence data, which solves the real-time and complex channel prediction issues in the field of the wireless communication.

DETAILED DESCRIPTION OF THE EMBODIMENTS

Figure 1:
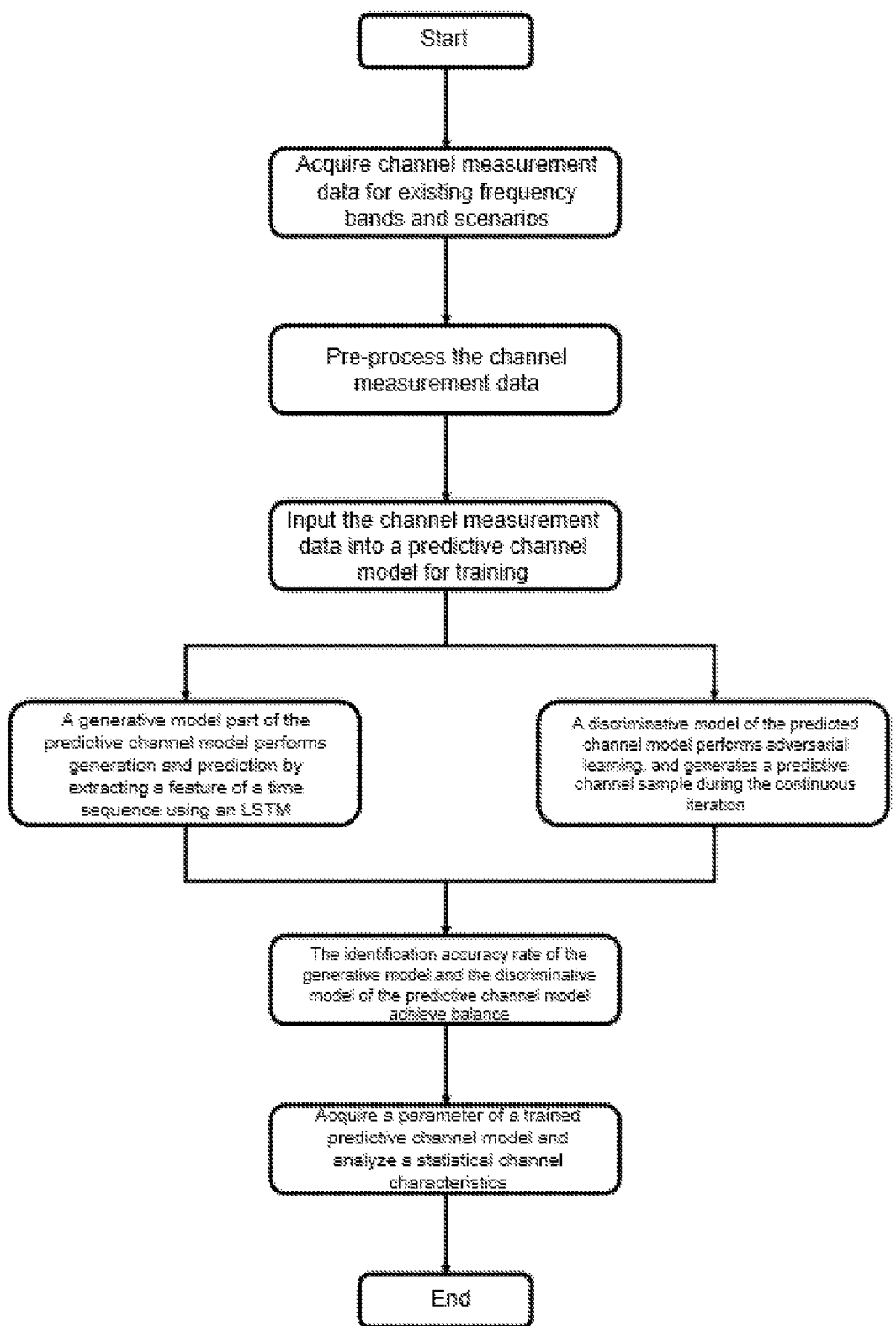
FIG. 1 illustrates a flow chart of a predictive channel modeling method based on a GAN and a LSTM artificial neural network provided in Embodiment 1 of the present disclosure.

In order to better understand the objectives, structures, and functions of the present disclosure, a predictive channel modeling method based on a GAN and a LSTM artificial neural network is further described in detail in combination with the accompanying drawings.

Embodiment 1

With reference to FIG. 1 to FIG. 4, this embodiment provides a predictive channel modeling method based on a GAN and a LSTM artificial neural network, and the method includes the following steps.

In Step 1, environment where wireless channels are positioned and physical environment parameters of an antenna position are determined.

Specifically, in this embodiment, the channel measurement environment is performed in an indoor corridor scene with a corridor length of 41 meters. This kind of multi frequency channel measurement activity is executed by a transmitter (TX) and a receiver (Rx). The Tx antenna and the Rx antenna are placed on a trolley to facilitating changing the positions thereof during the measurement. In addition, the height of the Tx antenna is 1.95 meters and the height of the Rx antenna is 1.45 meters.

In Step 2, a frequency band, a LOS condition and a NLOS condition that used for channel measurements in current environment are determined. A CIR of channel measurement data is collected by using the channel measurement instruments.

Specifically, in this embodiment, the channel measures three central frequency bands, that is, 2.4 GHZ, 5 GHZ, and 6 GHz, and a bandwidth of each central frequency is 320 MHz. A plurality of configurations related to the channel measurement instruments are listed herein: a delay resolution is 3.125 ns, a code length of Pseudo Noise code (PN) is 4800, and a maximum output power is 20 dBm. The measurement data matrix of the CIR under the LOS condition is 4800×37×5, where 4800 is a delay dimension, 37 is the number of the measurement positions, and 5 is the number of measurements in each of the positions. The measurement data matrix under the NLOS condition is 4800×34×5, where 34 is the number of measurement positions.

In Step 3, the collected channel measurement data are preprocessed, in the case where a neural network is used to train and learn channel data, an input CIR data set needs to be normalized. Normalization is a conventional preprocessing operation on the data set, which can prevent a certain dimension from having excessive impacts on the data distributions, and equipped with the ability to resist outliers. The normalization is relatively stable and suitable for the data scenarios with noises.

The steps are specifically as follows.

In Step 301, a mean value μ for channel measurement data examples and a standard deviation σ of the channel measurement data examples are calculated.

In Step 302, the CIR to the channel measurement data are normalized by using a z-score standardization means (z-score):

$$X = \frac{x - \mu}{\sigma},$$

where X is normalized data and x is original measurement data. The normalization does not change the information on the original channel measurement data, but only changes the data within a range from 0 to 1. This data preprocessing can accelerate the convergence speed of the training network.

In Step 4, a predictive channel model based on the GAN and the LSTM are constructed.

Figure 2:
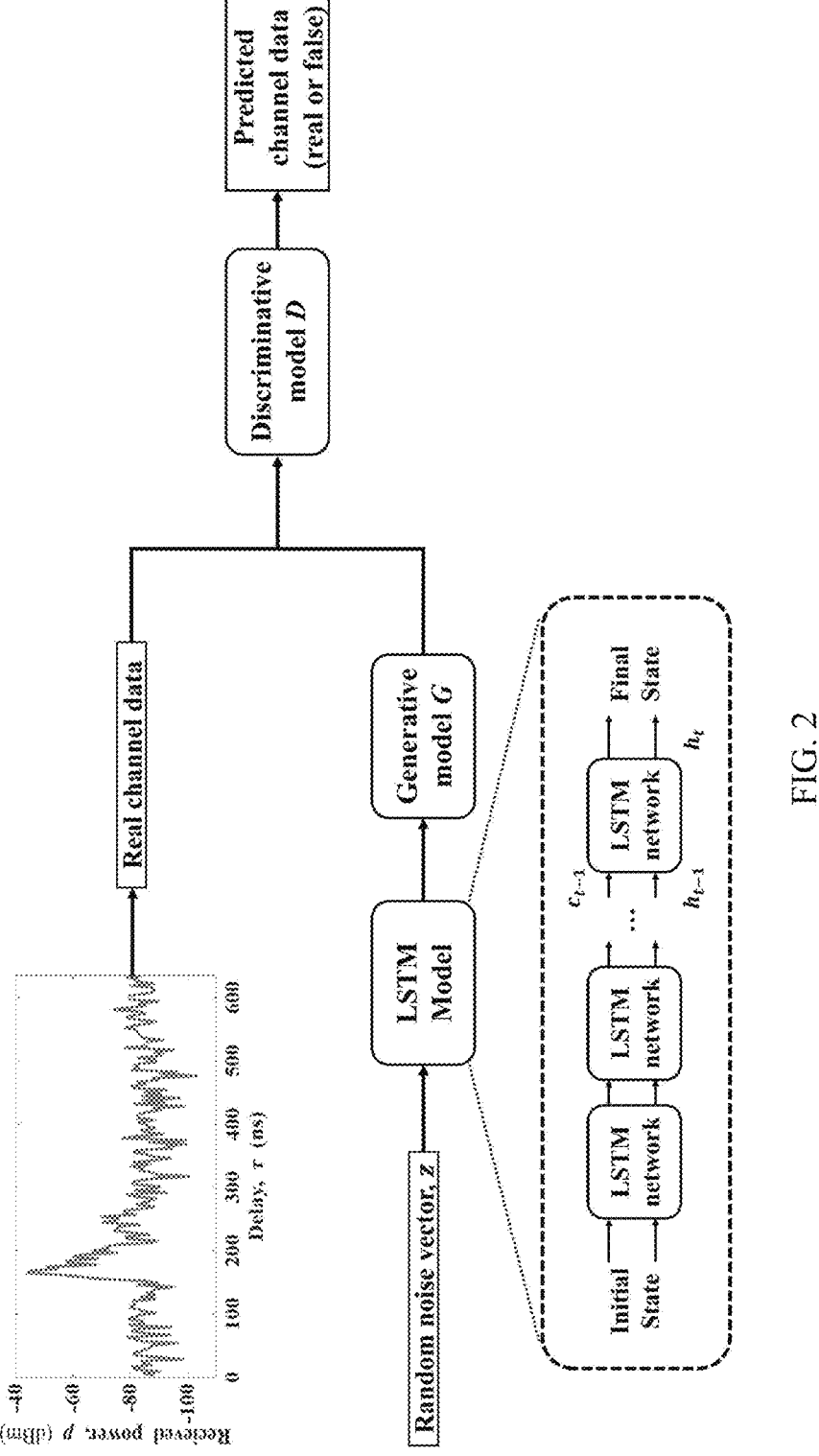
FIG. 2 illustrates a schematic diagram of the predictive channel modeling method based on the GAN and the LSTM artificial neural network provided in Embodiment 1 of the present disclosure.

Specifically, in this embodiment, the schematic diagram of the predictive channel model based on the GAN and the LSTM is as illustrated in FIG. 2.

Firstly, a part of a generative model for the GAN of the predictive channel model is constructed, and a function of the generative model is to generate the channel data with specific properties by utilizing noise vectors z. The eventual objectives of the generative model are to generate the channel parameters with the real channel distribution characteristics, and to fit the original real data as much as possible to deceive the discriminative model for the GAN, achieving effects of confusing fake with real.

Figure 3:
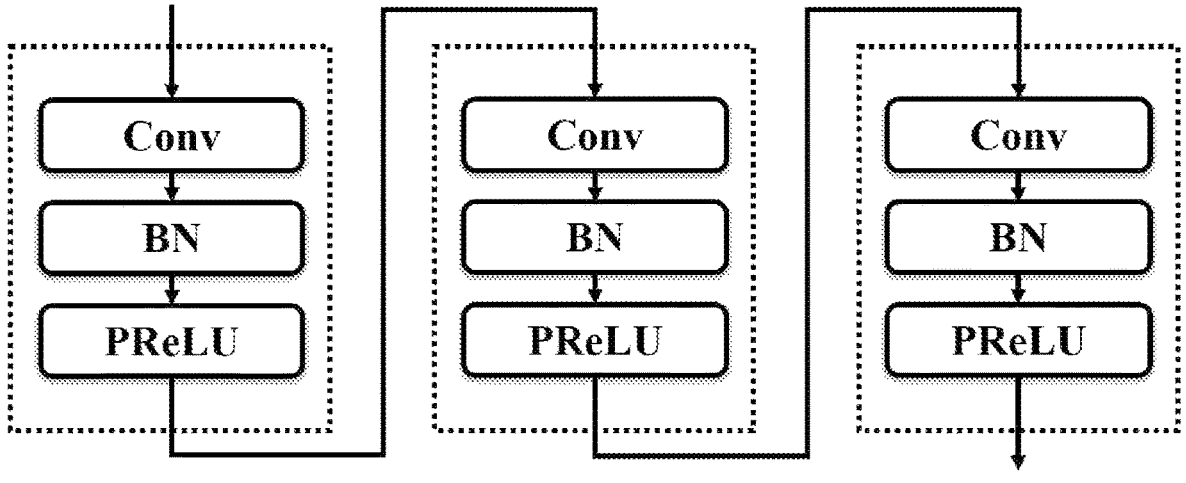
FIG. 3 illustrates a schematic diagram of a generative model of a predictive channel model provided in Embodiment 1 of the present disclosure.

Specifically, in this embodiment, the schematic diagram of the generative model for the predictive channel model is as illustrated in FIG. 3, and the steps are specifically as follows.

In Step 401, firstly, three convolutional layers are taken as the main structure of the generative model for the GAN, since the three Conv layers has good recognizing performance on the high-dimensional matrices and complex characteristics.

In Step 402, a BN layer is added after each of the Conv layers, and the function of the BN layer is to normalize an output of each node in the neural network, to enhance a generalization and a robustness of the generative model.

In Step 403, an activation function of a PRELU is used for reprocessing. The activation function can adaptively learn the parameters for the rectifier, improving accuracy, while the additional computational cost can be ignored, such that the accuracy and the efficiency of the training can be improved.

In Step 404, the LSTM neural network is added into the constructed generative model for the GAN as an input port to construct a generative model framework for the GAN-LSTM. The LSTM network is quite effective in learning long-term dependencies in time-series-related modeling, and can effectively and accurately predict channel data on a time scale.

Specifically, in this embodiment, the predictive issue of the LSTM is to predict a subsequent channel state by using states previous to j data in continuous channel data in the space-time domain, where the specific value of j is 6. An output $h_t$ of the LSTM includes obtained time step update information from a space-time domain sequence:

$$h_t = f_{LSTM}(h(n - j + 1), h(n - j + 2), \dots, h(n)),$$

where $f_{LSTM}$ represents a functional of the LSTM artificial neural network for a sequence prediction on sequence data, h(n) is the channel impulse response to the channel measurement data, and n is the n-th sampling point in the continuous CIR sequence.

In Step 5, a part of a discriminative model for the GAN in the predictive channel model is constructed. Since the discriminative model needs to know the distribution characteristics of the real channel data in the discriminative model, the construction on the discriminative model may be slightly more complex than that of the generative model.

Figure 4:
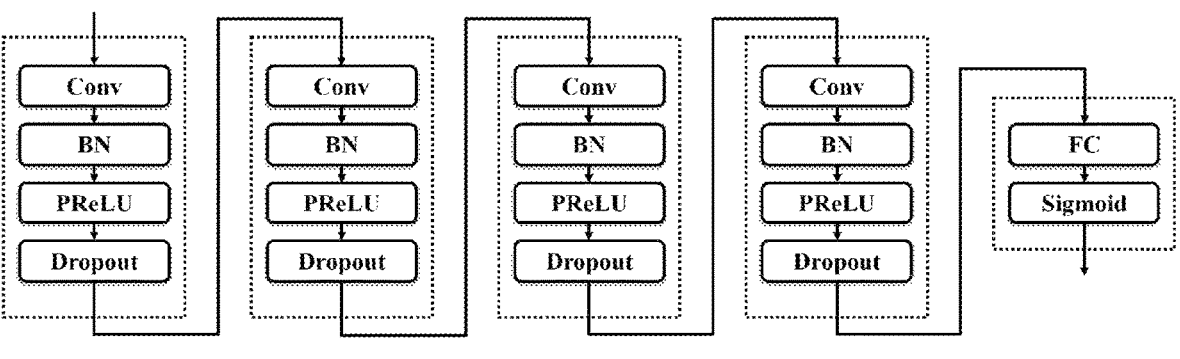
FIG. 4 illustrates a schematic diagram of a discriminative model of the predictive channel model provided in Embodiment 1 of the present disclosure.

Specifically, in this embodiment, the schematic diagram of the discriminative model for the predictive channel model is as illustrated in FIG. 4, and the steps are specifically as follows.

In Step 501, four Conv layers are taken as the main structure of the discriminative model for the GAN, and the four Conv layers are used for extracting multi-dimensional characteristics in a time domain, to facilitate identifying and correcting the generated channel data.

In Step 502, a BN layer is added after each of the Conv layers to enhance a generalization and a robustness of the model.

In Step 503, an activation function of the PRELU is used to improve an accuracy and an efficiency of a training.

In Step 504, a Dropout layer is added after the activation function of the PReLU, such that this network layer can improve an anti over-fitting ability of the model and enhance the universality of the model.

In Step 505, an additional FC layer is added after a network structure of the last Conv layers to act as a classifier in an entire CNN, thereby achieving the better learning efficiency.

In Step 506, a Sigmoid function is added at an end of the discriminative model.

In Step 6, after the predictive channel model based on the GAN and the LSTM is constructed, the predictive channel model is trained.

Specifically, in this embodiment, the hyperparameters of the model training are set as follows. The weights of the two sub-modules in the predictive channel model are updated by the Adam optimizer, such that the over-fitting phenomenon can be avoided. The batch size for training is 128; the training period is 2500; the initial learning rates of both the generative model and the discriminative model are 0.0001, and the learning rate decay is set to be 0.9. The steps are specifically as follows.

In Step 601, the CIR obtained from measurements is input as a reference sample for an input of the model for a training predictive channel model.

In Step 602, during an iterative adversarial learning process of model training, a balance is achieved between an identification accuracy rate of the generative model for the predictive channel model and an identification accuracy rate of the discriminative model for the predictive channel model.

Assuming that the generative model processes a random Gaussian noise vector z to obtain a generated data distribution $P_G$, and an actual data distribution is $P_{data}$. In the case where the generated channel data are input into the discriminative model, these networks need to be repeatedly used in multiple training iterations, and a loss value of the discriminative model is minimized by dynamically adjusting a weight of this layer. Throughout the entire training process, the values for $P_G$ and $P_{data}$ should be as close as possible. As the number of the training iterations increases, the performance of the generative model in generating channel data improves, and the generative model also affects the feature distributions of the discriminative model. During a cyclic training process, an ability of the discriminative model tends towards a convergence value, thus achieving an optimal value:

$$D_G^* = \frac{P_{data}}{P_G + P_{data}},$$

where $D_G^*$ is the optimal value for a discriminator. Therefore, as $P_G$ approaches $P_{data}$, $D_G^*$ approaches 0.5, and the discriminative model is no longer able to distinguish between the real channel data and the channel data generated by the predictive channel model. At this point, the channel data generated by the generative model can be perfectly comparable to the real data, achieving points of confusing fake with real.

In Step 7, trained predictive channel model parameters are obtained and channel statistical characteristics are analyzed.

Figure 5:
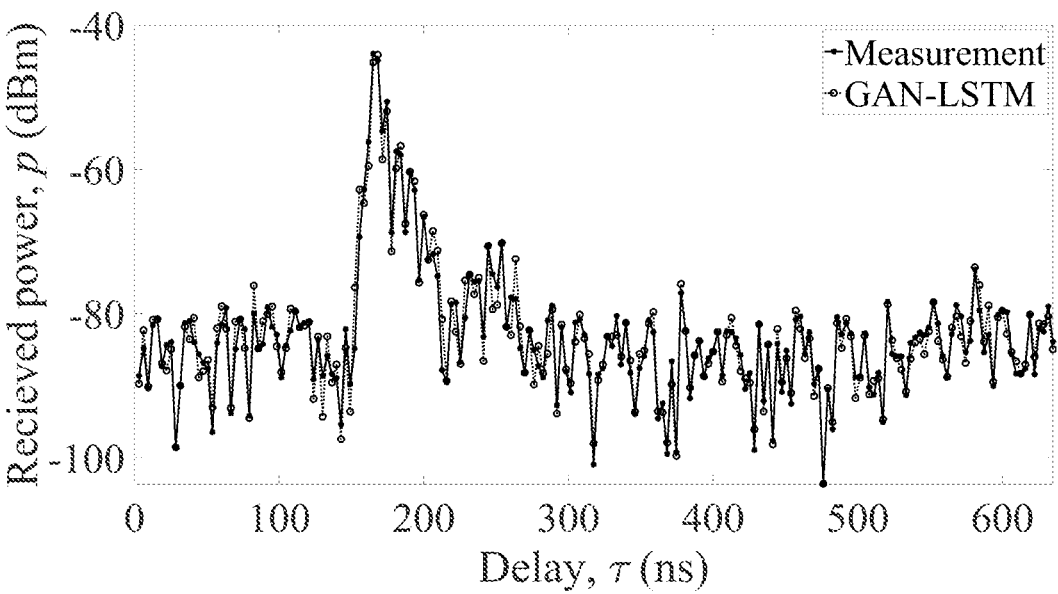
FIG. 5 illustrates a schematic diagram of a comparison between a CIR obtained from the predictive channel model provided in Embodiment 1 and a CIR obtained from real measurement data.
Figure 6:
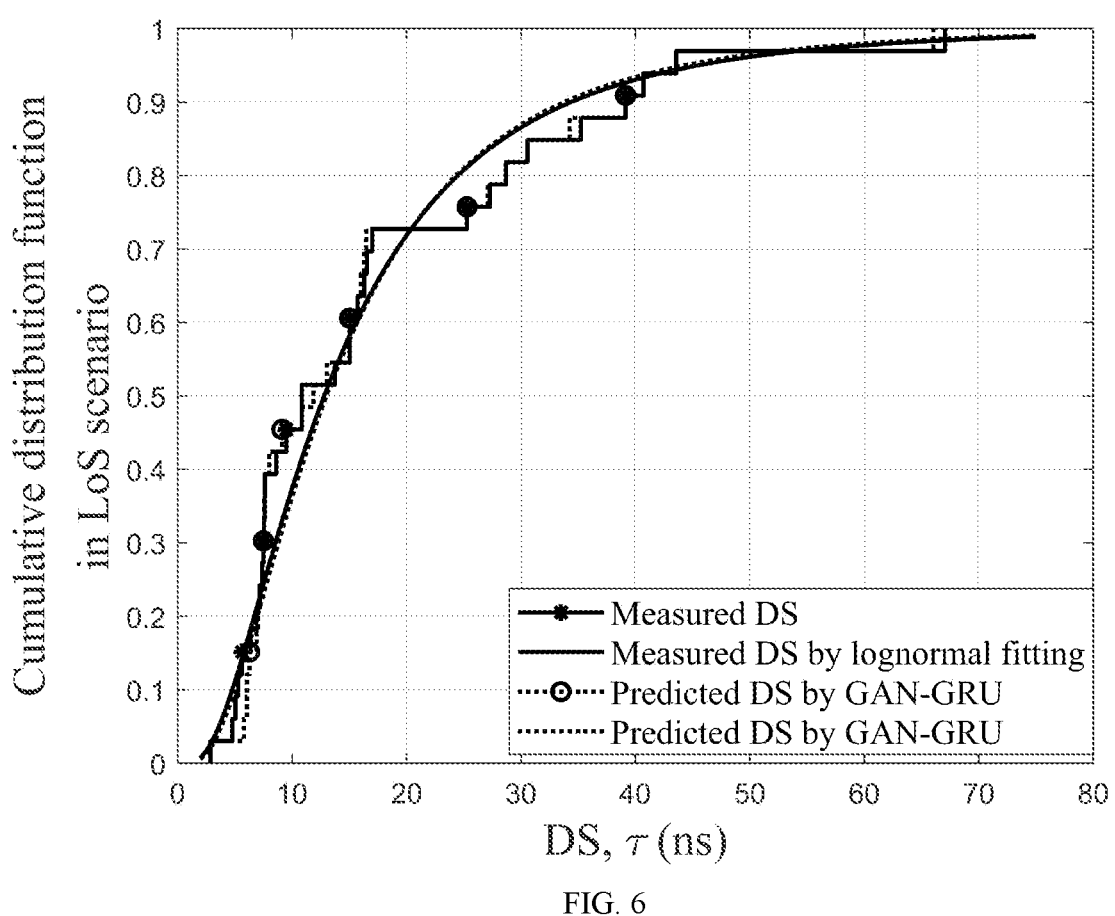
FIG. 6 illustrates a schematic diagram of a comparison between a DS obtained from the predictive channel model under a LOS condition provided in Embodiment 1 and a DS calculated from the real measurement data.
Figure 7:
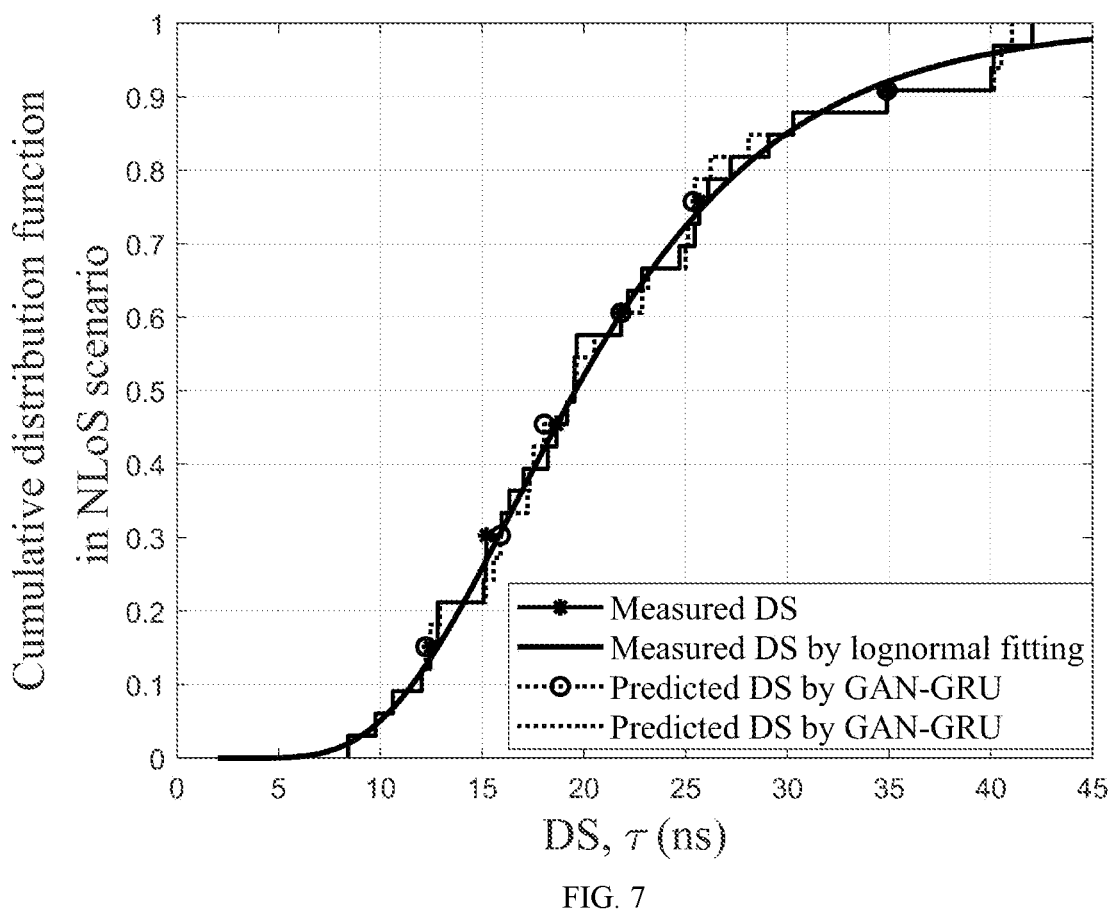
FIG. 7 illustrates a schematic diagram of a comparison between a DS obtained from the predictive channel model under a NLOS condition provided in Embodiment 1 and a DS calculated from the real measurement data.

Specifically, in this embodiment, the channel prediction accuracy is analyzed by using the CIR predicted from the predictive channel model and the CIR of the channel measurement data, and the channel statistical characteristic is analyzed by using the predicted DS and the DS calculated from the channel measurement data, to compare the effectiveness and impacts of the predictive channel model on predicting the generation of real measurement data. The simulation results are illustrated in FIG. 5, FIG. 6, and FIG. 7. It can be seen from the simulation diagrams that the predictive channel model fits with the CIR of the real channel measurement data, such that the correctness of the predictive model can be verified. Further, by observing the predicted channel statistical characteristic images and the measured channel statistical characteristic images, it can be found that the constructed predictive channel model has strong efficiency and accuracy in predicting and generating the channel characteristics distributions in real scenarios, and the constructed predictive channel model can solve the issues of real-time and complex channel prediction in different frequency bands and scenarios in the wireless communication, and the data generating ability can generate enough channel data sets for the simulation experiments of the channel modeling.

In summary, the predictive channel model based on the GAN and the LSTM established by the present disclosure solves a major problem in the channel modeling based on AI, and the problem is that a large number of data sets are difficult to be obtained. Through the data augmentation of the GAN, a massive data sets are obtained, accurate model parameters are effectively provided, and the problem of insufficient data in the channel measurements and the simulations is solved. The statistical characteristics of the simulations have reference values for the design of the wireless communication system.

It can be understood that the present disclosure is described through a plurality of embodiments, and a person skilled in the art knowns that various changes or equivalent replacements can be made to these features and embodiments without departing from the spirit and the scope of the present disclosure. In addition, under the guidance of the present disclosure, these features and the embodiments can be modified to adapt to specific situations and materials without departing from the spirit and the scope of the present disclosure. Therefore, the present disclosure is not limited by the specific embodiments disclosed herein, and all the embodiments falling within the scope of claims of the present disclosure are all within the protection scope of the present disclosure.

What is claimed is:

1. A predictive channel modeling method based on a generative adversarial network and a long short-term memory artificial neural network, wherein the method comprises following steps:

Step 1, determining environment where wireless channels are positioned and physical environment parameters for an antenna position;

Step 2, determining a frequency band, a line-of-sight condition and a non-line-of-sight condition that are used for channel measurements in current environment, and collecting, by using channel measurement instruments, a channel impulse response to channel measurement data;

Step 3, preprocessing the collected channel measurement data, normalizing, in a case where a neural network is used to train and learn channel data, an input channel impulse response data set as needed;

Step 4, constructing a predictive channel model based on the generative adversarial network and the long short-term memory artificial neural network; firstly, constructing a part of a generative model for the generative adversarial network in the predictive channel model, and a function of the generative model is to generate the channel data with specific properties by utilizing noise vectors z;

Step 5, constructing a part of a discriminative model for the generative adversarial network in the predictive channel model;

Step 6, training, after constructing the predictive channel model based on the generative adversarial network and the long short-term memory artificial neural network, the predictive channel model; and Step 7, obtaining trained predictive channel model parameters and analyzing channel statistical characteristics.

2. The predictive channel modeling method based on the generative adversarial network and the long short-term memory artificial neural network according to claim 1, wherein Step 3 specifically includes following steps:

Step 3.1, calculating a mean value μ for channel measurement data examples and a standard deviation σ of the channel measurement data examples; and Step 3.2, normalizing, by using a z-score standardization means, the channel impulse response to the channel measurement data:

$$X = \frac{x - \mu}{\sigma},$$

where X is normalized data and x is original measurement data.

3. The predictive channel modeling method based on the generative adversarial network and a long short-term memory artificial neural network according to claim 2, wherein Step 4 specifically includes following steps:

Step 4.1, taking three convolutional layers as a main structure of the generative model for the generative adversarial network;

Step 4.2, adding a batch normalization layer after each of the convolutional layers, and normalizing an output of each nodes in the neural network to enhance a generalization and a robustness of the generative model;

Step 4.3, reprocessing, by using an activation function of a parametric rectified linear unit; and Step 4.4, adding the artificial neural network into the constructed generative model for the generative adversarial network as an input port, to construct a generative model framework for the generative adversarial network and the long short-term memory artificial neural network; wherein a predictive issue of the long short-term memory artificial neural network is to predict a subsequent channel state by using states previous to j data in continuous channel data in a space-time domain, and an output $h_t$ of the long short-term memory artificial neural network includes obtained time step update information from the space-time domain sequence:

$$h_t = f_{LSTM}(h(n - j + 1), h(n - j + 2), \ldots, h(n)),$$

where $f_{LSTM}$ represents a function of the long short-term memory artificial neural network for a sequence prediction on sequence data, h(n) is the channel impulse response to the channel measurement data, and n is a n-th sampling point in a latency the continuous channel impulse response sequence.

4. The predictive channel modeling method based on the generative adversarial network and a long short-term memory artificial neural network according to claim 3, wherein Step 5 specifically includes following steps:

Step 5.1, taking four convolutional layers as a main structure of the discriminative model for the generative adversarial network, for extracting multi-dimensional characteristics in a time domain, to facilitate identifying and correcting the generated channel data;

Step 5.2, adding a batch normalization layer after each of the convolutional layers to enhance a generalization and a robustness of the model;

Step 5.3, using an activation function of a parametric rectified linear unit to improve an accuracy and an efficiency of a training;

Step 5.4, adding a Dropout layer after the activation function of the parametric rectified linear unit to improve an anti over-fitting ability of the discriminative model;

Step 5.5, adding an additional fully connected layer after a network structure of a last convolutional layer to act as a classifier in an entire convolutional neural network; and Step 5.6, adding a Sigmoid growth curve activation function at an end of the discriminative model.

5. The predictive channel modeling method based on the generative adversarial network and a long short-term memory artificial neural network according to claim 4, wherein Step 6 specifically includes following steps:

Step 6.1, inputting the channel impulse response obtained from measurements as a reference sample for an input of the model for training a predictive channel model;

Step 6.2, achieving a balance between an identification accuracy rate of the generative model for the predictive channel model and an identification accuracy rate of the discriminative model for the predictive channel model, during an iterative adversarial learning process of model training, and Step 6.2 specifically includes following steps:

Step 6.2.1, setting the generative model to process a random Gaussian noise vector z to obtain a generated data distribution $P_G$, wherein an actual data distribution is $P_{data}$;

Step 6.2.2, repeatedly using, in a case where the generated channel data are input into the discriminative model, these networks as needed in multiple training iterations, and minimizing, by dynamically adjusting a weight of this layer, a loss value for the discriminative model; and Step 6.2.3, enabling, during a cyclic training process, an ability of the discriminative model to tend towards a convergence value, thus obtaining an optimal value:

$$D_G^* = \frac{P_{data}}{P_G + P_{data}},$$

where $D_G^*$ is an optimal value for a discriminator.

\* \* \* \* \*